United States Patent [19]

Dukek

[11] Patent Number: 5,319,394
[45] Date of Patent: Jun. 7, 1994

[54] SYSTEM FOR RECORDING AND MODIFYING BEHAVIOR OF PASSENGER IN PASSENGER VEHICLES

[76] Inventor: Randy R. Dukek, 4664 Tower St., Apt. 233, Prior Lake, Minn. 55372

[21] Appl. No.: 653,357

[22] Filed: Feb. 11, 1991

[51] Int. Cl.⁵ .............................................. H04N 7/18
[52] U.S. Cl. ..................................... 348/148; 348/158
[58] Field of Search ................. 358/105, 229, 93, 108; 360/5; 348/148, 158

[56] References Cited

U.S. PATENT DOCUMENTS

| | | | |
|---|---|---|---|
| 3,349,679 | 10/1967 | Lohman, III | 340/545 X |
| 3,535,442 | 10/1970 | Jennings | 358/108 |
| 4,112,818 | 9/1978 | Garehime, Jr. | 358/108 X |
| 4,414,576 | 11/1983 | Randmae | 358/229 |
| 4,816,828 | 3/1989 | Feher | 360/5 X |
| 4,949,186 | 8/1990 | Peterson | 360/5 X |
| 4,984,089 | 1/1991 | Stiepel | 358/108 X |
| 5,012,335 | 4/1991 | Cohodar | 358/108 |

Primary Examiner—Victor R. Kostak
Attorney, Agent, or Firm—Jerold M. Forsberg

[57] ABSTRACT

A system for modifying behavior of passengers in passenger vehicles includes housings and video tape recording equipment. When the system is used with a plurality of vehicles there is at least one fully operational vide recording arrangement in housings in one of the vehicles along with empty housings set up to have the appearance of being operational arrangements in the other vehicles. The operational video recording arrangement is for keeping a video taped record of activity in a passenger area of the vehicle. The empty housings set up to appear operational help reduce the expense of the system and complement the operational arrangement to deter undesirable behavior of passengers in the passenger areas of the vehicles.

17 Claims, 3 Drawing Sheets

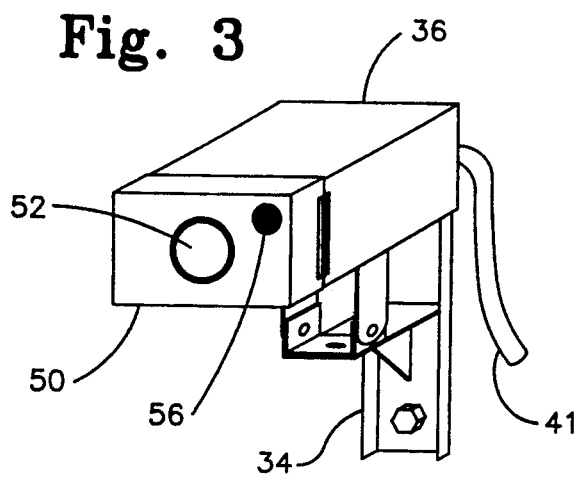
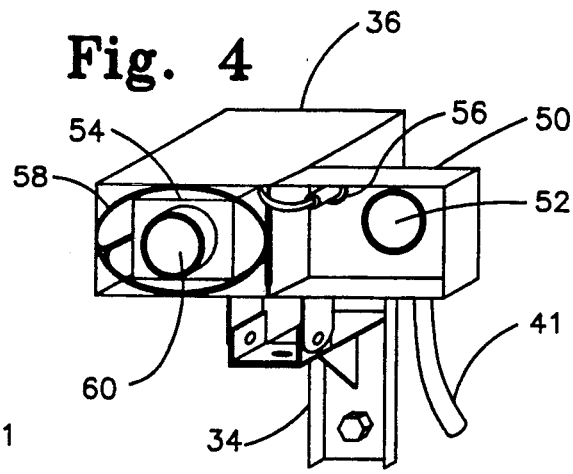
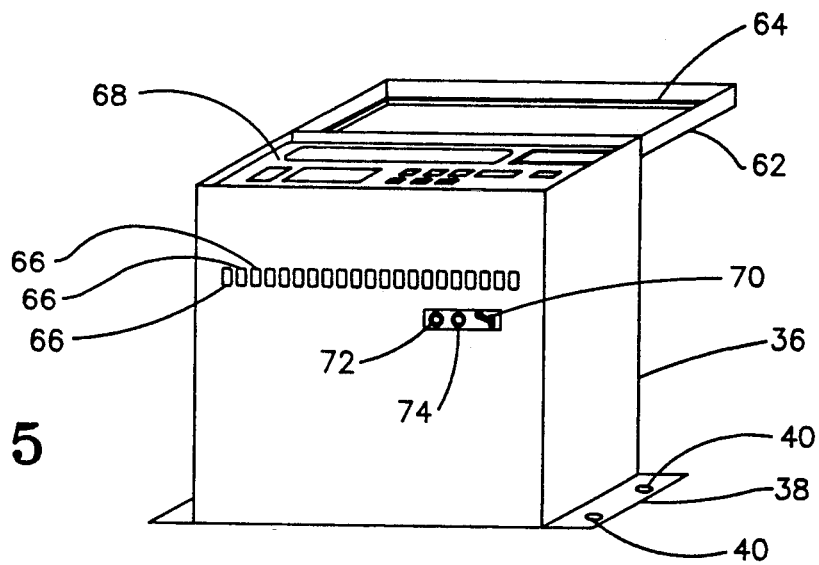
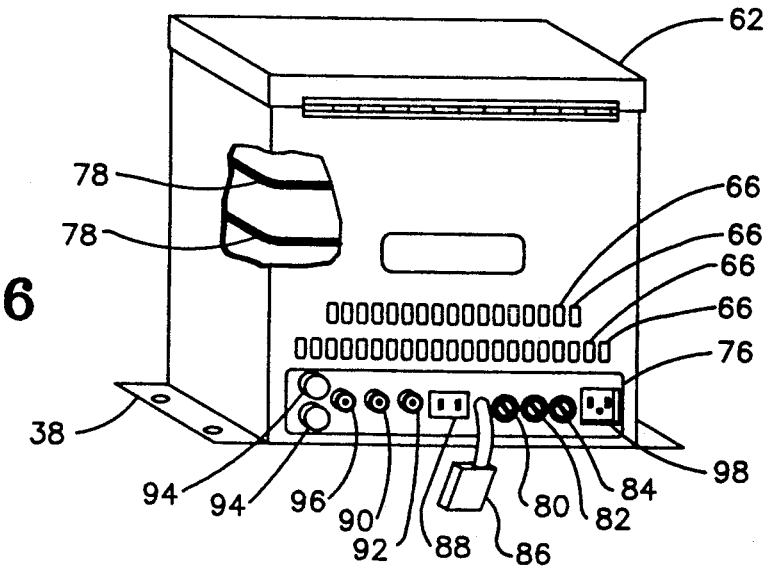

5,319,394

SYSTEM FOR RECORDING AND MODIFYING BEHAVIOR OF PASSENGER IN PASSENGER VEHICLES

BACKGROUND OF THE INVENTION

The present invention relates generally to a behavior modification system, and more specifically to a system which includes housings for a video tape recording system which when mounted in a school bus with a video camera and a video cassette recorder contained therein can monitor and keep a video history of activity in the passenger seating area and wherein when the housings are empty have the appearance of being a fully operational monitoring system.

The instant invention is generally related to the field of surveillance and monitoring and more particularly relates to the ongoing problems with discipline on school buses. Most of the time the only adult on a school bus is the driver and it is usually the driver's responsibility to drive the bus in a safe manner in addition to maintaining the discipline of the students riding on the bus. A lack of discipline among the students on a school bus can be very distracting for the driver and can potentially be the cause of a serious accident.

Most school districts rely on the school bus driver to report incidents involving a lack of discipline to a transportation director who in turn must either take action to remedy the situation or report the incident to the school systems' administration for remedial action. In either case the foremost concern is to alleviate the possibility of an accident or injury.

The problem frequently encountered when attempts are made to remedy a situation involving discipline of students is the denial by the students and/or the disbelief by parents of the reports of unacceptable behavior on the bus. All too often disputes over the validity of the report are the focus of discussions and the unacceptable behavior is left uncorrected. The result being that the behavior pattern which may cause an accident or injury is unchanged and the bus driver is then in the position of having to transport a student or group of students who have not been properly disciplined after having been involved in a reported and disputed incident. Situations such as this are not uncommon and often result in worse behavior problems that in turn result in more situations with the potential for accidents or injury.

Monitoring systems in vehicular environments are known and various approaches have been taken. One approach, depicted in U.S. Pat. No. 3,349,679, shows a camera mounted in the inside of a taxi such that a photo record of all the passengers can be accurately provided. Another approach, depicted in U.S. Pat. No. 4,112,818, shows a tape recording system and weapon system for dealing with airplane hijackers. Yet another approach, found in U.S. Pat. No. 4,843,463, shows a tape recording system in a vehicle used to keep a record of information concerning the operation of the vehicle.

The one viable prior known answer to the problem of maintaining discipline on school buses has been to have a parent volunteer ride the bus and help the driver. Other than this, there has not been a viable solution proposed and there is no known prior art which teaches a behavior modification system as disclosed and claimed herein.

SUMMARY OF THE INVENTION

According to the present invention, a behavior modification system includes housings, which when mounted in a school bus with a video tape recording system contained therein, is a fully operational monitoring system which can monitor and keep a video taped history of activity in the passenger area and, which when empty, have the appearance of being a fully operational monitoring system. The apparatus for housing includes a housing for a video camera, a housing for a video cassette recorder, and an adjustable bracket for the mounting of the camera housing above a driver area in the school bus. The video tape recording system for keeping a video taped history of activity occurring in the passenger seating area in the bus includes a power converter, a video cassette recorder, and a video camera.

Accordingly, it is an object of the present invention to provide a behavior modification system for school buses.

It is another object of the invention to provide a monitoring system for school buses which will result in a video history of activity occurring in the passenger seating area.

It is yet another object of the invention to provide apparatus for housing a video tape recording system in school buses which, when the housings are empty, appears to be a fully operational monitoring system.

It is also an object of this invention to provide a behavior modification system which overcomes the problems found in the prior art and which is relatively simple to use after installation.

Other objects and advantages of the present invention will be apparent and understood from the following detailed description when taken in conjunction with the accompanying drawings.

BRIEF DESCRIPTION OF THE DRAWINGS

FIG. 3 is a perspective view of the camera housing and of the bracket used to support the camera housing;

FIG. 4 is a view similar to FIG. 3 with the cover of the camera housing open to show a video camera and heating coil contained therein;

FIG. 5 is a perspective view of the housing for the video cassette recorder with the cover open;

FIG. 6 is a view similar to FIG. 5 showing the back side of the housing for the video cassette recorder with the cover closed and a portion of the housing broken away to show the heating coil contained therein.

DETAILED DESCRIPTION OF THE PREFERRED EMBODIMENT

Figure 1:
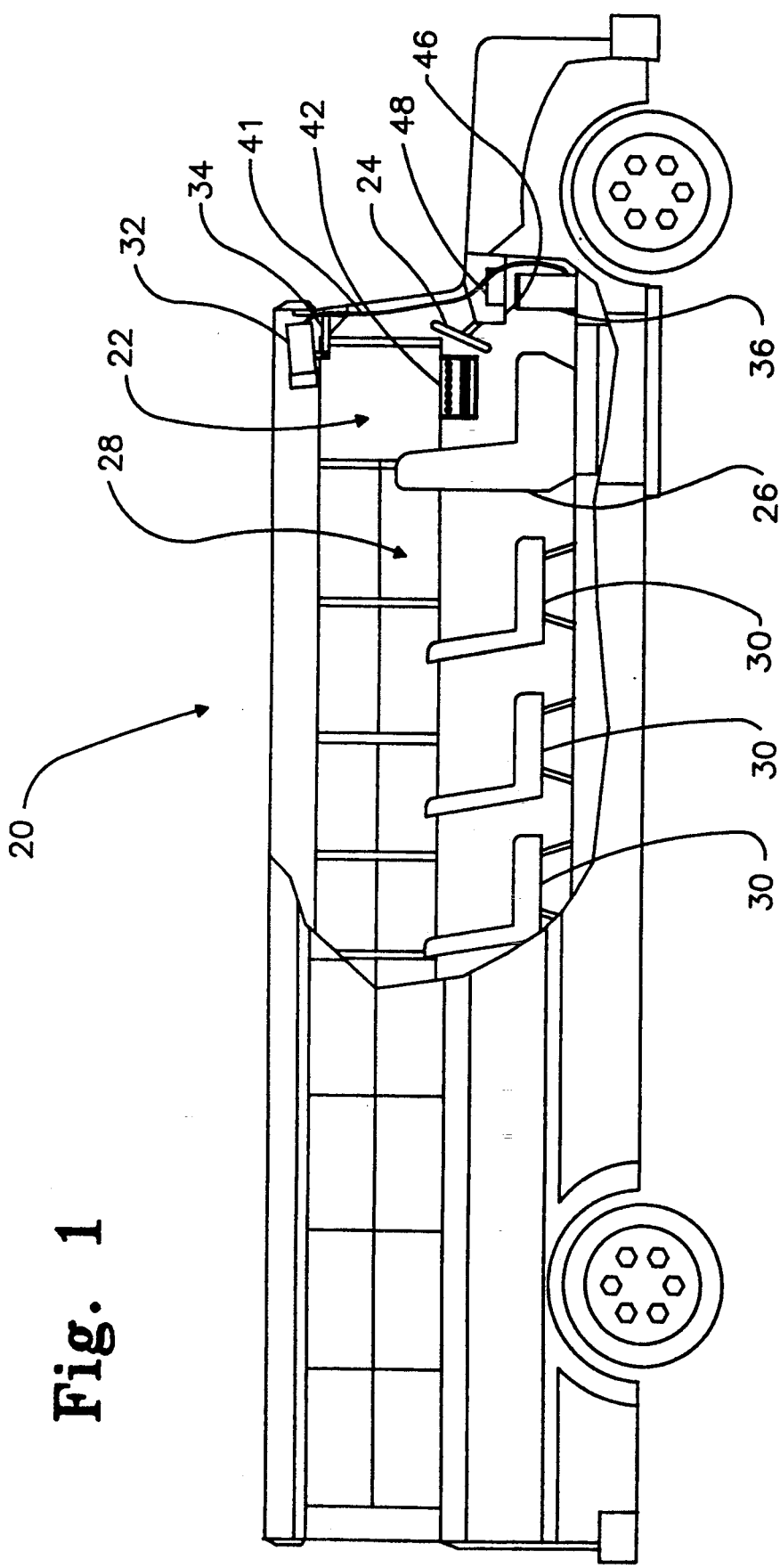
FIG. 1 is a view showing a preferred use of the invention in a vehicle, such as a school bus, with portions of the vehicle broken away for clarity.

Reference hereinbelow is made to the drawings wherein like reference numerals have been employed to designate the same or similar components throughout the various views.

Figure 2:
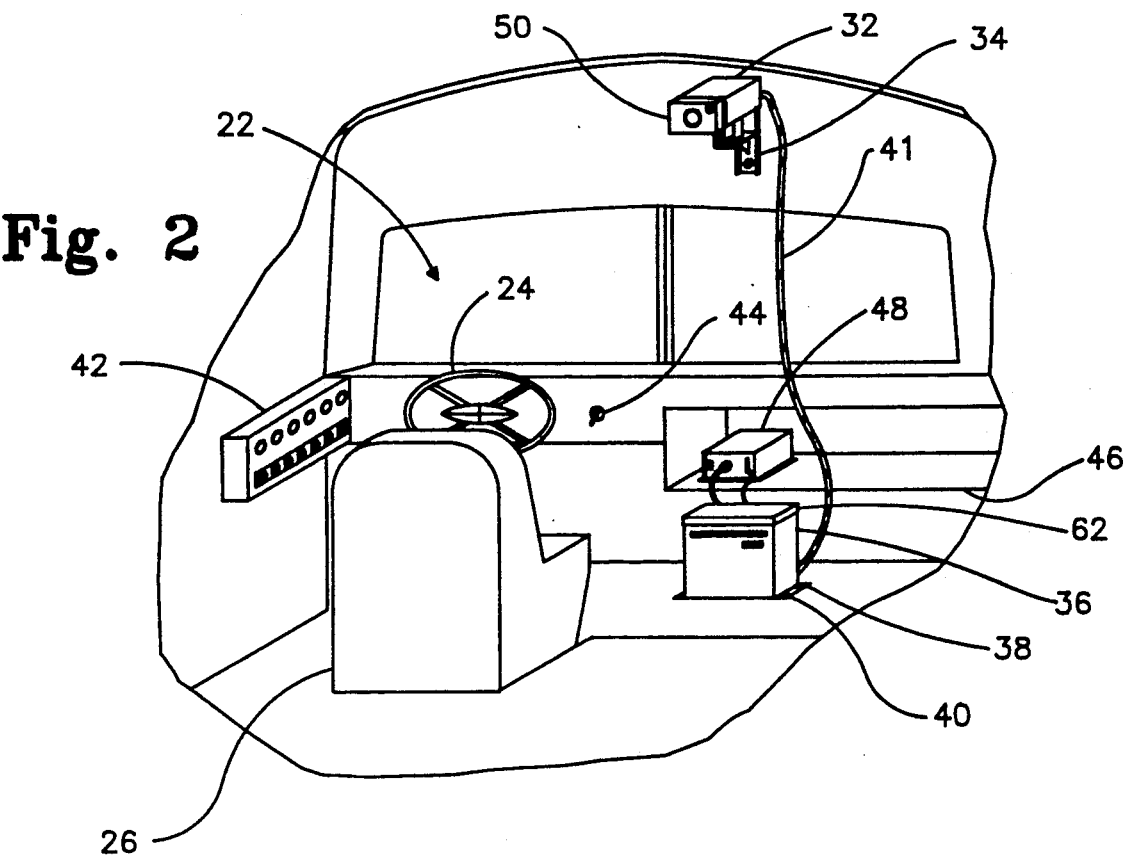
FIG. 2 is a view of a portion of the inside of the school bus showing components of the invention relative to a driver area.

Referring now to FIGS. 1 and 2, a school bus 20 includes a driver area 22 with a steering wheel 24 and a driver's seat 26 and a passenger seating area 28 with a plurality of seats 30. A housing 32 for a video camera is adjustably mounted above driver area 22 by an adjustable bracket 34. A housing 36 for a video cassette recorder includes flanges 38 through which fasteners 40 cooperate to secure the housing 36 relative to the bus 20. Housing 32 and housing 36 are interconnected by electrical cables 41 which are bundled for ease of routing. Bus 20 also includes a typical control panel 42 controlled completely or in part by an ignition switch 44 and a shelf 46 on which electrical converter 48 can either freely rest or be attached.

Housing 32 includes a cover 50 with a window 52 therein such that a video camera 54 can be functionally contained within the housing with the cover closed (see FIGS. 3 and 4). Cover 50 also includes a microphone 56 and housing 32 includes a heating coil 58 for keeping condensation from forming on the lenses 60 of the video camera and window 52 in the cover.

Housing 36 has a cover 62 with a seal 64 and multiple vents 66 on the front and back sides thereof (see FIGS. 5 and 6). Vents 66 have filters for filtering air passing therethrough for the cooling of a video cassette recorder 68 contained within housing 36. Readily accessible on the front side of housing 36 is switch 70 and a pair of indicator lights 72 and 74. Housing 36 includes an electrical panel 76 on the backside thereof, the purpose for which will be discussed later, and a heating coil 78, similar to the heating coil 58, for keeping the video cassette recorder and a cassette tape being used therein warm during cold weather.

In order to provide 120 volt power for those components of the system which have such a need, a power converter 48 is necessary. It has been found that an inverter known as a Wilmore model 1401-12 is a very good source of 120 volt power when connected to the 12 volt system of the bus.

Figure 7:
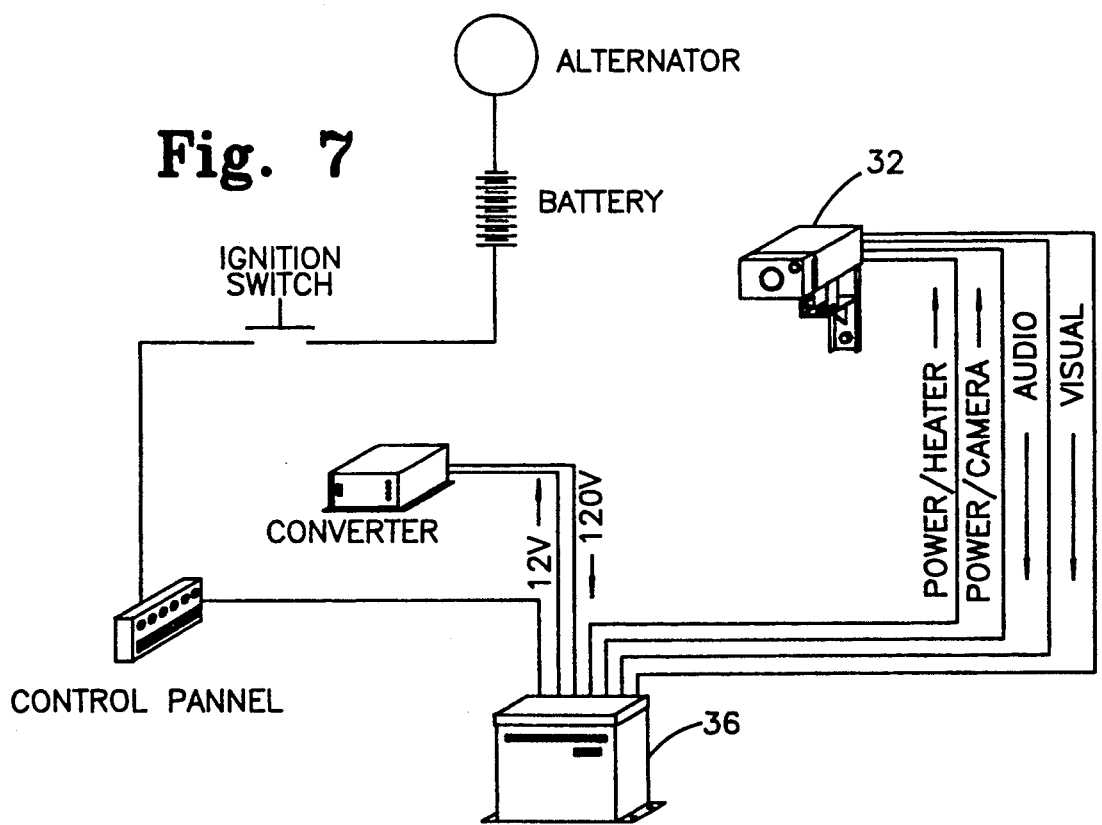
FIG. 7 is a simplified wiring diagram showing the interconnection of the electrical components of the invention to the electrical generating system of a vehicle.

There is a preferred wiring scheme for the installation of the behavior modification system in a vehicle which involves the use of the wiring panel 76 included near the bottom of the back wall of the housing 36 (see FIGS. 6 and 7). Power for the system originates in the electrical power generating system of the vehicle and is used as the main source of power for the behavior modification system. Control panel 42 receives 12 volt power from a battery which is kept charged in a typical manner by an engine driving an alternator. The 12 volt power from the battery can be directed through ignition switch 44 to control panel 42 (as shown in FIG. 7) or be directly connected such that there is power available even though the ignition switch is off. It is preferred to have a portion of the panel receive power directly from the battery and have a separate on/off switch such that the portion of panel 42 to which the behavior modification system is attached does not depend on whether the vehicles' ignition is turned on or off. Either way, 12 volt power from the control panel 42 is supplied to the wiring panel 76 by way of electrical cable connected to connection 80. From there some of the 12 volt power is transmitted to converter 48 by way of electrical cable connected to connection 82 where it is converted to 120 volt power. The 120 volt power is then transmitted back to the wiring panel 76 by way of electrical cable to connection 84 where it is then used for supplying power to electrical components of the system that need 120 volt power while the 12 volt power at the wiring panel 76 is used to supply power to those electrical components of the system which require 12 volt power.

Appropriate power from the wiring panel 76 is then directed by way of connection 86 to the video camera 54 and microphone 56 and by way of connection 88 to the heating coil 58. Wiring panel 76 includes a connection 90 for receiving video input from the camera 54 and a connection 92 for receiving audio input from the microphone 56. It should be noted that the connection of the video cassette recorder to the system are made inside the confines of housing 36. Finally, there is a pair of fuses 94 connected in appropriate places in the electrical system on the wiring panel to protect the system, a connection for a monitor if one is wanted on the bus, and a connection for an external 120 volt power supply for keeping the heating coils 58 and 78 warm when the bus is parked, e.g., at the bus garage. Power supplied to the tape recording system is routed through on/off switch 70 and power supplied to the indicator lights 72 and 7 is made by appropriate connections such that light 72 indicates when the system is turned on and indicator light 74 indicates when a tape being used in the video cassette recorder is full. It should be understood that electrical cable of appropriate sizes and lengths are used to interconnect the pieces of equipment as discussed herein and that the arrangement and number of connections, fuses, lights and/or switches on the housing 36 can vary but that the preferred arrangement is as shown.

In use, it is foreseen that each bus of a fleet of buses could have an operational monitoring system installed therein. However, because of the expense, it is foreseen that a fleet of buses may have only one or two operational monitoring systems installed therein and that each of the other buses could have only the apparatus for housing installed in a manner such that the indicator light for indicating the on condition for an operational monitoring system is functional. Accordingly, students riding in a bus, which is part of a fleet of buses, wherein one or more of the buses have fully operational monitoring systems, would not be able to discern whether the system on their bus was operational or not. It is contemplated that the apparatus for housing can be mounted and prewired such that the components of the video tape recording system could be easily moved from the housings in one bus to the housings in another bus.

Ideally, an operational monitoring system will have sufficient cassette tapes available to make a tape history of at least a week of activity in the passenger area for purposes of review and comparison to establish behavior patterns. It is also preferred for the video cassette recorder to be of the type which includes a time and date generator. Accordingly, when an incident occurs that may need disciplinary action there will be a tape history showing times and dates which will remove any doubt as to whether the incident(s) occurred thereby facilitating the handling of any necessary disciplinary action. It is the presence of the monitoring system and, in the alternative, the apparatus for housing, which has the appearance of a fully operational monitoring system, that will cause a modification of behavior in students who are concerned about being disciplined for inappropriate behaviors.

While this invention has been described with a certain degree of particularity, it is manifest that many changes may be made in the details of construction and in the arrangement of components without departing from the spirit and scope of the disclosure. It is understood that the invention is not limited to the embodiments set forth herein for purposes of exemplification, but is limited only by the scope of the attached claims, including the full range of equivalency to which each element thereof is entitled.

What is claimed is:

1. A monitoring system for a vehicle such as a school bus including a driver area and a passenger seating area, the monitoring system comprising housing mean and video tape recording means, the video tape recording means including camera means, video cassette recorder means, and power means, the housing means being disposed within the vehicle and including housing means for containing the camera means therein, housing means for containing the video cassette recorder means therein, and means for connecting the camera means and the video cassette recorder means to the power means whereby a video history can be made of activity occurring in the passenger seating area, said housing means for the camera means including a cover having a window therein and the system including adjustable bracket means for accommodating mounting of the housing means for the camera means above the driver area in varying models of buses, said bracket means including adjustable mounting means for permitting adjustment of a viewing direction of the camera means contained within the housing means for the camera means, said housing means for the video cassette recorder means including indicator light mean for indicating when the system is on, indicator light means for indicating whether a cassette tape in the video cassette recorder means is full, cover means with a seal, filtered openings for permitting passage of cooling air to the video cassette recorder means, and means to secure the housing means for the video cassette recorder means relative to the vehicle.

2. A monitoring system as set forth in claim 1 wherein the housing means for the camera and the housing means for the video cassette recorder means are separate housing means and said housing means for the camera means includes a heating means for keeping condensation from forming on lenses of the camera means and the window in the cover and the housing means for the video cassette recorder means includes heating means for keeping the video cassette recorder warm during cold weather.

3. A monitoring system as set forth in claim 2 wherein said video cassette record means includes a time and data generator.

4. A monitoring system for a vehicle such as a school bus including a driver area and a passenger seating area, the monitoring system comprising housing mean and video tape recording means, the video tape recording means including camera means, video cassette recorder means, and power means, the housing means being disposed within the vehicle and including housing means for containing the camera means therein, housing means for containing the video cassette recorder means therein, and means for connecting the camera means and the video cassette recorder means to the power means whereby a video history can be made of activity occurring in the passenger seating area, said school bus including a key operated ignition system and a control panel connected to an electrical generating system in the school bus, a wiring panel on the housing for the video cassette recording means connected to the control panel, and said power means including a power inverter connected to the wiring panel for supply 120 volts of power to the video cassette recorder means.

5. A monitoring system as set forth in claim 4 wherein said housing means for the video cassette recorder means includes indicator light means for indicating when the system is on, indicator light means for indicating when a cassette tape in the video cassette recorder means is full, switch means for turning the system on, and an electrical panel for interconnecting electrical components of the system to the electrical system of the bus.

6. A monitoring system for a vehicle such as a school bus including a driver area and a passenger seating area, the monitoring system comprising housing mean and video tape recording means, the video tape recording means including camera means, video cassette recorder means, and power means, the housing means being disposed within the vehicle and including housing means for containing the camera means therein, housing means for containing the video cassette recorder means therein, and means for connecting the camera means and the video cassette recorder means to the power means whereby a video history can be made of activity occurring in the passenger seating area, said housing means for the camera means including a heating means for keeping condensation from forming on lenses of the camera means.

7. Apparatus for housing a video tape recording system in a passenger vehicle including a passenger seating area, the apparatus comprising camera housing means including window means disposed within said vehicle, bracket means for mounting the camera housing means in said vehicle, video cassette recorder housing means having at least one indicator light means, means interconnecting said camera housing means and said video cassette recorder housing means, and power means for energizing said indicator light means thereby giving the apparatus for housing the appearance of being a fully operational monitoring system, said apparatus for housing being mounted in a school bus and said video cassette recorder housing means including a wiring panel connected to an electrical generating system in the bus, and power converter means interconnected to said camera housing means by way of said wiring panel on said video cassette recorder housing means.

8. A system for modifying behavior of passengers in school buses wherein there is a plurality of buses and each bus of said plurality includes a driver area and a passenger seating area, the system comprising apparatus for housing a video tape recording system for each bus of said plurality of buses, said apparatus for each bus including camera housing means having lens window means, bracket means for mounting the camera housing means, video cassette recorder housing means having at least one indicator light means, and power means for energizing said indicator light means thereby giving said apparatus for housing the appearance of being a fully operational monitoring system, and wherein at least one bus of said plurality of buses includes an operational video camera in said camera housing means, an operational video cassette recorder in said video cassette recorder housing means, and power means for supplying power as needed to operate said video tape recording system wherein a video taped history of activity in the passenger seating area can be kept for said at least one bus.

9. A system as set forth in claim 8 wherein said video cassette recorder housing means includes a wiring panel for interconnecting an electrical system of said bus and electrical components of the system.

10. A system as set forth in claim 9 wherein said video cassette recorder housing means includes a cover with a seal, filtered openings for permitting passage of cooling air to the video cassette recorder, and means to fix the housing means relative to the bus.

11. A system as set forth in claim 8 wherein said adjustable bracket means accommodates mounting of the camera housing means above the driver area in varying models of buses, said adjustable bracket means having adjustable mounting means for adjusting the viewing position of the camera housing means.

12. A system as set forth in claim 9 wherein said at least one bus includes means for generating electrical power, a key controlled ignition system, and a control panel connected to the means for generating electrical power by way of the key controlled ignition system, said power means including a power converter connected to said control panel by way of said wiring panel whereby power from said means for generating electrical power can be transmitted to said video tape recording system.

13. A system as set forth in claim 8 wherein said camera housing means includes heating means for keeping condensation from forming on lenses of the video camera and the lens window means.

14. A system as set forth in claim 12 wherein said camera housing means and said video cassette recorder housing means are separate housing means and said camera housing means includes heating means for keeping condensation from forming on lenses of the camera and the lens window means and said video cassette recorder housing means includes heating means for keeping the video cassette recorder warm during cold weather.

15. A system as set forth in claim 8 wherein said video cassette recorder includes a time and date generator.

16. Apparatus for housing a video tape recording system in a passenger vehicle including a passenger seating area, the apparatus comprising camera housing means including window means disposed within said vehicle, bracket means for mounting the camera housing means in said vehicle, indicator light means visible from said passenger seating area, and power means for energizing said indicator light means thereby giving the apparatus for housing the appearance of being fully operational monitoring system.

17. A system for modifying behavior of passengers in school buses wherein there is a plurality of buses and each bus of said plurality includes a driver area and a passenger seating area, the system comprising apparatus for housing a video tape recording system for each bus of said plurality of buses, said apparatus for housing for each bus including camera housing means having lens window means, bracket means for mounting the camera housing means, indicator light means visible from said passenger seating area, and power means for energizing said indicator light means to thereby give said apparatus for housing the appearance of being a fully operational monitoring system, and wherein at least one bus of said plurality of buses includes an operational video tape recording system including a video camera in the camera housing means in said at least one bus and power means for supplying power as needed to operate said video tape recording system wherein a video taped history of activity in the passenger seating area can be kept for said at least one bus.

* * * * *